Nov. 1, 1949  F. B. PFEIFFER  2,486,762
METHOD FOR WRAPPING ARTICLES
Filed Nov. 6, 1945  5 Sheets-Sheet 1
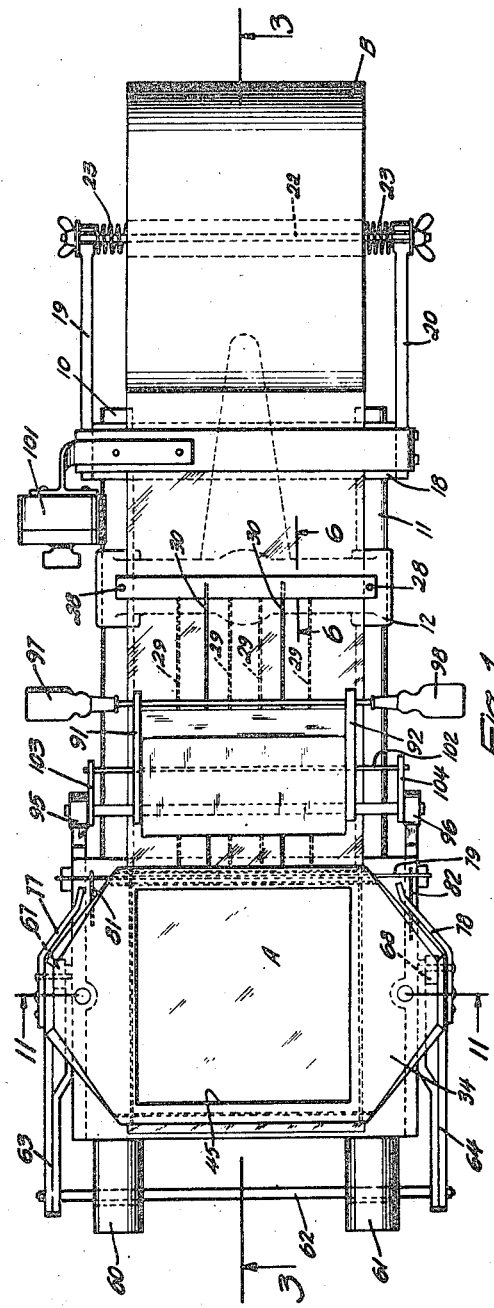
INVENTOR
Fred B. Pfeiffer
BY
ATTORNEY

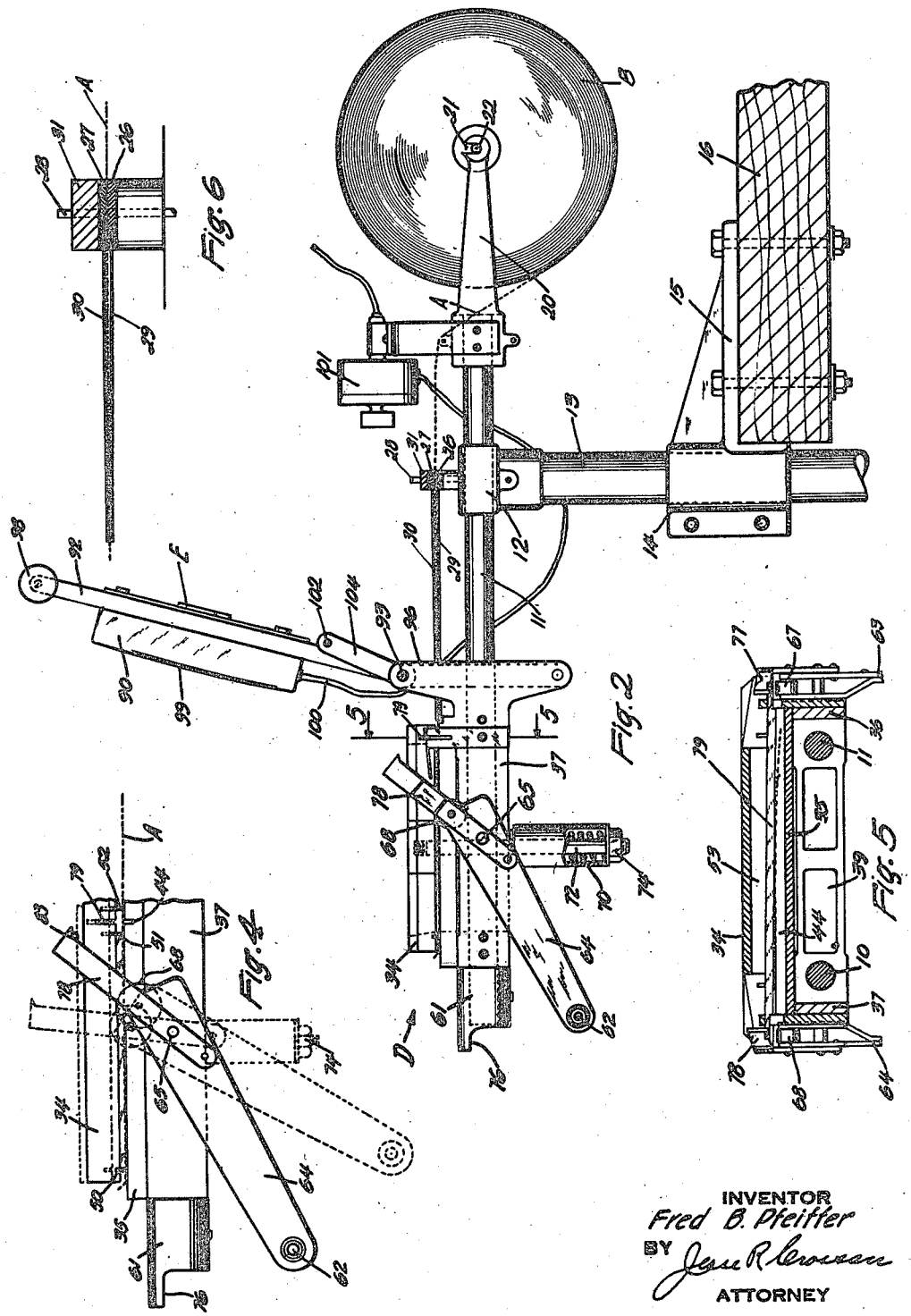

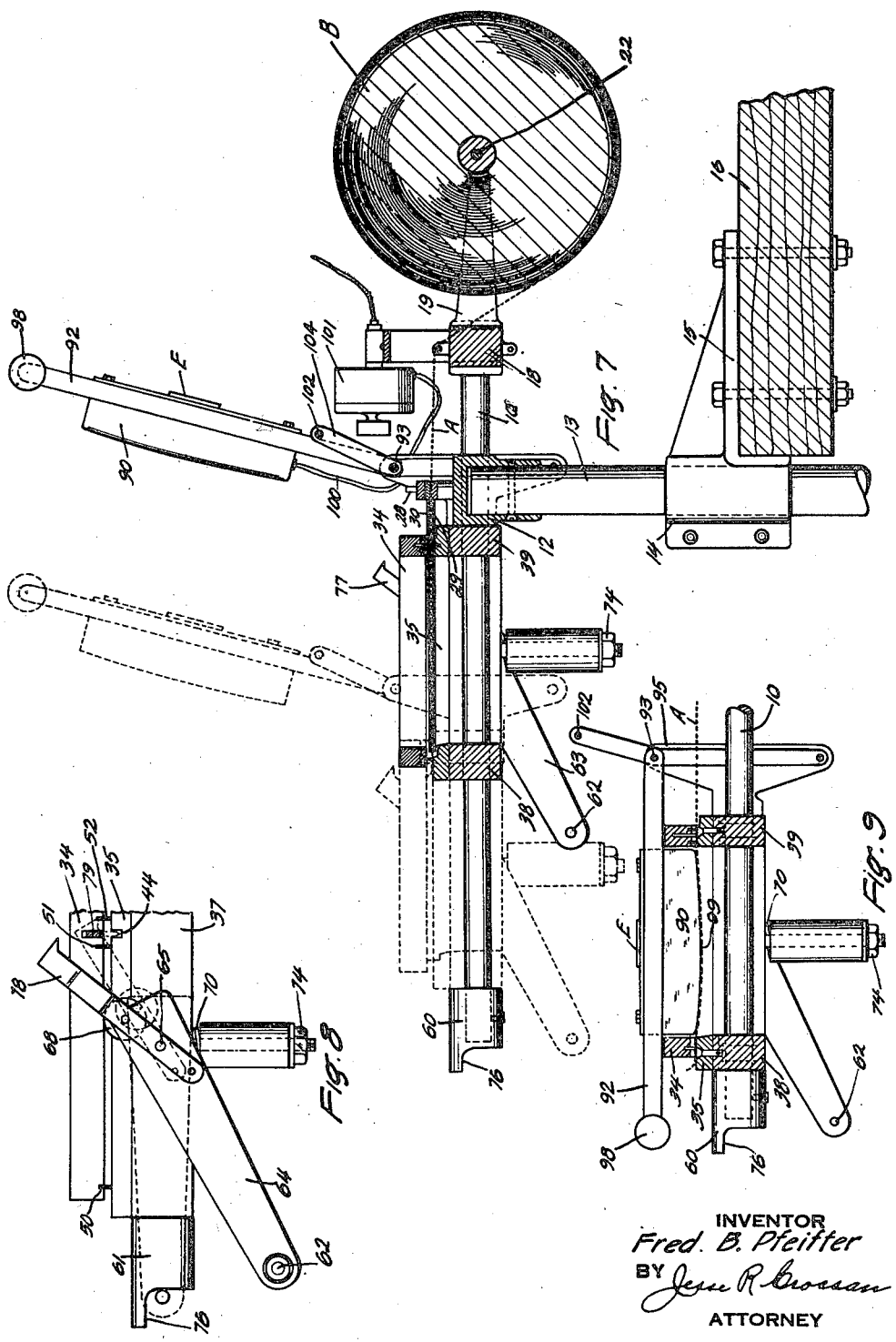

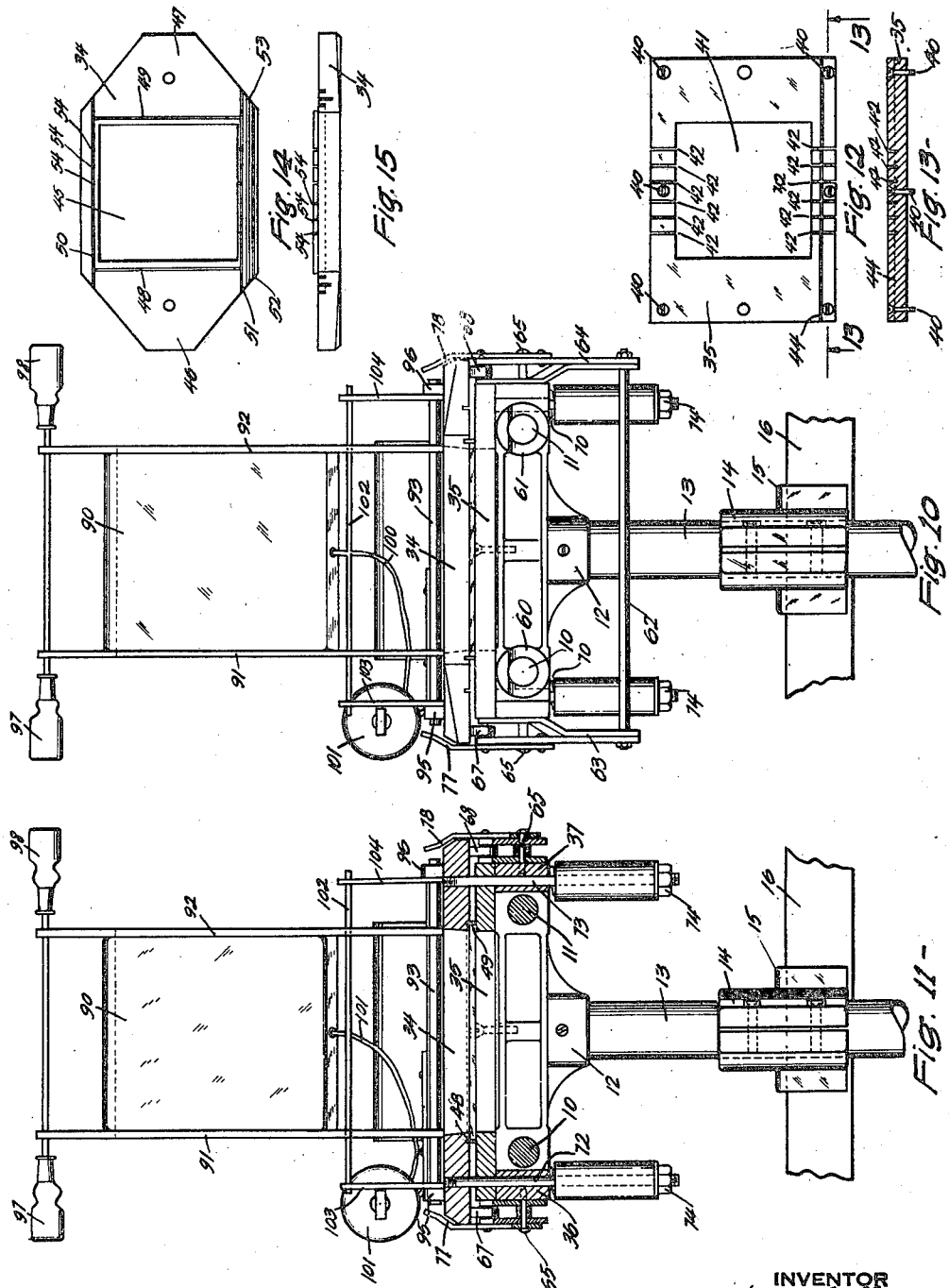

Nov. 1, 1949   F. B. PFEIFFER   2,486,762
METHOD FOR WRAPPING ARTICLES
Filed Nov. 6, 1945   5 Sheets-Sheet 5
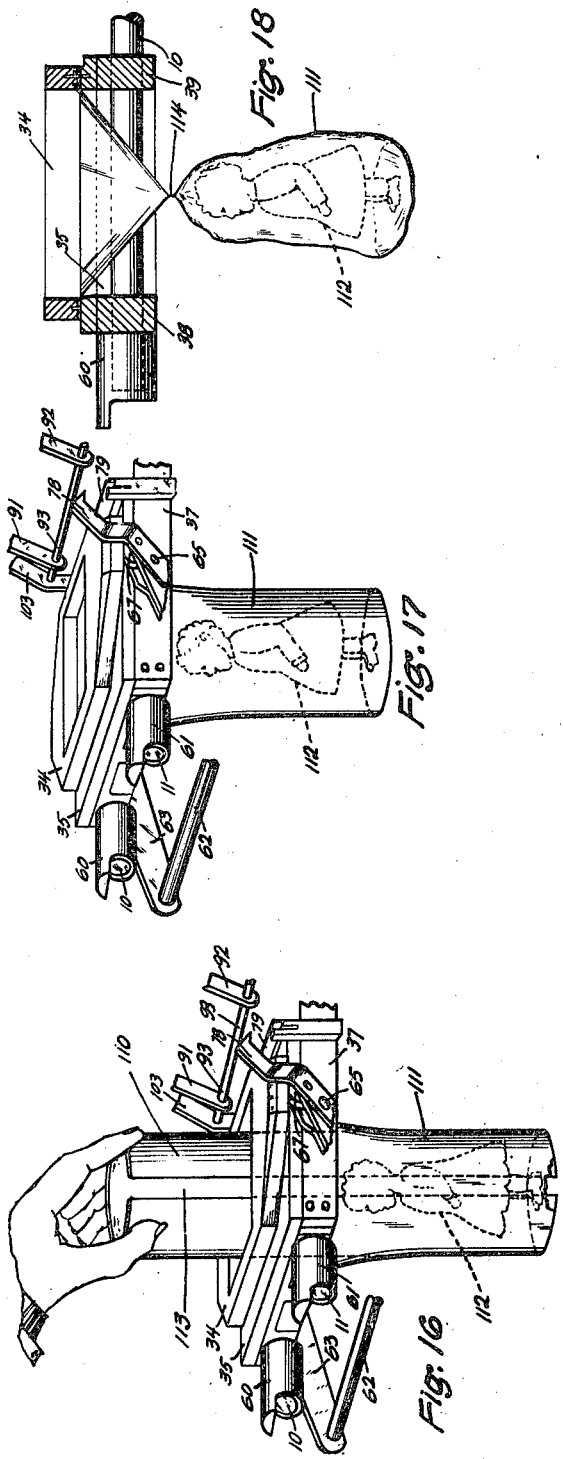
INVENTOR
Fred B. Pfeiffer
BY Jesse R. Crossan
ATTORNEY Patented Nov. 1, 1949

2,486,762

UNITED STATES PATENT OFFICE 2,486,762

METHOD FOR WRAPPING ARTICLES

Fred B. Pfeiffer, Akron, Ohio

Application November 6, 1945, Serial No. 627,062

9 Claims. (Cl. 18—56)

This invention relates to an improved method of wrapping articles. The invention carries forward the broad inventive concept disclosed in my copending application Serial No. 193,214, filed February 28, 1938, and it adds thereto certain steps in the method having practical importance.

The invention especially contemplates wrapping, either partly or completely, various objects with a film or sheet of such a nature as to be capable of readily conforming to any desired shape to accommodate the object or article or material being wrapped, and of either hugging the object or article tightly or enclosing it loosely as may be preferred. In some practices of the invention such film or sheet material is preferably moistureproof and impermeable to air or other gases and heat sealable, that is, capable of having engaging portions fused together when heated. On such material which is suitable for practicing the invention and which is commercially available is a rubber hydrohalide, more specifically a rubber hydrochloride, under the trade name of "Pliofilm," such material being more specifically described in the Calvert Patent No. 1,989,632 of January 29, 1935.

One feature of the invention contemplates supporting and holding edge portions of an appropriate piece of the wrapping material, softening the material by heat, and thereafter molding it to the desired shape with the aid of a hollow preforming device. The molding just referred to may be accomplished by thrusting the preforming device into, through and beyond the plane of the wrapping material which is being held for this purpose. This operation results in stretching the mid portion of the film or sheet, the amount of stretch being selective according to the particular articles being wrapped.

Another feature of the invention resides in twisting the stretched film or sheet after the object has been placed into it and after removal of the preforming device and while the edge portions are still being held whereby to cause the film or sheet to completely surround and enclose the article.

The foregoing and other objects, features and advantages of the invention will be readily appreciated from the following description in connection with the accompanying drawings wherein one form of the invention has been shown by way of illustration, and wherein Fig. 1 is a top plan view of a machine embodying the invention and adapted for practicing the novel method;

Fig. 2 is a side elevation thereof and illustrating one method of mounting the machine on a bench, table or the like;

Fig. 3 is a vertical longitudinal sectional view through the machine taken approximately on the line 3—3 of Fig. 1;

Fig. 4 is a fragmentary side elevation illustrating parts of the carriage operating and cutting mechanism in different positions;

Fig. 5 is a vertical transverse sectional view taken approximately on the line 5—5 of Fig. 2 and illustrating more particularly the sheet cutting mechanism;

Fig. 6 is a detail sectional view on an enlarged scale showing sheet guiding means, the section being taken approximately on the line 6—6 of Fig. 1;

Fig. 7 is a vertical longitudinal sectional view somewhat similar to Fig. 3 but showing the parts in different relative position;

Fig. 8 is another fragmentary vertical longitudinal sectional view illustrating the carriage and clamping means at the wrapping position with the heating means in operative position;

Fig. 9 is a fragmentary vertical longitudinal sectional view illustrating the carriage and clamping means at the wrapping position with the heating means in operative position;

Fig. 10 is a front or end view of the machine as viewed from the left of Fig. 3 and 7;

Fig. 11 is a vertical transverse sectional view taken approximately on line 11—11 of Fig. 1;

Fig. 12 is a top plan view of the lower clamping plate or bed plate;

Fig. 13 is a vertical transverse sectional view through the same taken approximately on line 13—13 of Fig. 12;

Fig. 14 is a bottom plan view of the upper clamping plate;

Fig. 15 is a rear elevation thereof;

Fig. 16 is a fragmentary perspective view of the previously described mechanism but illustrating the use of a preforming device in the practice of the method, and Figs. 17 and 18 are detail views showing successive steps following that of Fig. 16.

Referring now to the drawings it will be seen that the sheet wrapping material A, such as that previously referred to as "Pliofilm" is drawn in strip form from a stockroll B through suitable guide means C to a clamping mechanism which is designated generally by the letter D. This clamping mechanism D is characterized by a central opening within which or over which the sheet material A is adapted to be held taut. While the sheet is thus held taut it is heated quickly by a suitable heater E and immediately thereafter the preforming device 110 (Figs. 16 to 18) is thrust or projected against the so-held and heated sheet in such a way as to deform and stretch portions of the sheet whereby to form a pocket or sack for the object to be wrapped. The extent of stretching to which the sheet material is thus subjected may vary as desired for the wrapping of different objects. At any rate the shaping of the sheet material is commenced by pushing the preforming device to and beyond the plane of the clamped sheet. When it is desired to completely enclose the object, it and the partly formed sheet may be grasped either by hand or otherwise and turned in such a way as to impart a contracting twist to remaining portions of the sheet, as shown for example in Fig. 18. The invention contemplates this contracting twist shall be accomplished by a relative rotary movement between the object being wrapped and the clamping means, and may be accomplished by turning the object itself in reference to the clamping means, or by turning the clamping means while holding the object and the partly formed sheet, or by turning both the object and the clamping means relative to each other. The heating which has previously been referred to must be sufficient to soften the sheet material to enable it to stretch as desired. The exact degree of heat which is applied may vary within certain limits according to the properties of the sheet and the amount of stretch necessary for wrapping any specific article. Any or all of the method steps referred to above may be carried out manually or automatically as desired.

The clamping mechanism D is mounted upon a reciprocating carriage which is slidably supported on a pair of substantially horizontal frame bars or rods 10 and 11 which are spaced from each other and parallel. These frame bars or rods 10 and 11 are secured in a substantial T-shaped bracket 12 which is secured upon the upper end of a standard 13, which in turn is adjustably clamped as at 14, in a mounting bracket 15 by means of which the assembly may be appropriately secured to a bench top, table or the like indicated at 16. In addition to being adjustable upwardly and downwardly in the bracket portion 14, the standard 13 may also be rotatably adjustable about its own axis.

Adjacent their inward or rearward ends, the frame bars or rods 10 and 11 are rigidly connected together by a cross member 18 to which are secured as best shown in Fig. 1 a pair of arms 19 and 20 which project rearwardly and are formed with slots 21 for receiving a rod 22 about which the stock supply roll B is rotatable. Coiled compression springs 23 or some similar means may be disposed between the ends of the stock supply roll B and the adjacent surfaces of the supporting arms 19 and 20 whereby to substantially center the stock supply roll and at the same time to impose upon the roll a slight frictional drag to prevent slackness in the sheet or strip drawn from the stock roll. A guide rod 25 is supported above the cross member 18 and constitutes the first guide with which the sheet material A comes in contact in its passage from the stock roll to the clamping means.

Directly over the frame bracket 12 there are mounted a pair of substantially straight flat bars 26 and 27, one above the other, they being held in place by a pair of dowel pins 28 which are carried adjacent the opposite ends of said frame member 12. The lower bar 26 is provided at its forward edge with a plurality of guide wires 29 (six such wires being shown in Fig. 1), said wires being slightly bent upward so that their outward or forward ends substantially come into the plane of the meeting faces of the bars 26 and 27. Similarly the forward edge of the upper bar 27 is provided with wires 30 (two being shown in Fig. 1), said wires 30 being slightly bent downward so that their outward or forward ends substantially meet the plane of the meeting faces of bars 26 and 27. The purpose of this arrangement is to give further support and guidance to the sheet material A as it passes from the first guide rod 25 to the clamping mechanism, and also to assist in tensioning the sheet so that it may best be presented to the clamping means. As best shown in Figs. 2, 3, 6 and 7 the sheet A passes between the bars 26 and 27 and between the wires 29 and 30. The arrangement is such that the bar 27 actually rests upon the passing sheet A, and if desired an additional weight 31 may rest upon the upper side of the bar 27. This arrangement prevents reverse movement of the film or sheet material A during part of the movement of the carriage, as will later be explained.

The clamping mechanism D includes an upper plate 34 and a lower plate 35 which are mounted upon and movable with the reciprocating carriage previously mentioned. This carriage may be formed as a single casting if desired or it may be assembled of several separate parts as for example a pair of side members 36 and 37 connected by a pair of transverse end members 38 and 39, in rectangular arrangement. The members 38 and 39 are appropriately bored, reamed or otherwise formed with openings (see Fig. 5) having sliding fit on the frame rods 10 and 11. Incidentally it is to be noted that the distance between the carriage members 38 and 39 in the one direction and the distance between the frame rods 10 and 11 in the other direction are sufficient to permit ready passage therebetween of an object to be wrapped and in some cases these dimensions will be sufficient to permit free passage of an operator's hand. The lower clamping plate or bed plate 35 may be removably secured to the carriage members 36, 37, 38 and 39 as by screws 40 or other appropriate fastening means. Details of this lower plate are shown in Figs. 12 and 13 wherein it will be seen that there is a substantial central opening 41 to permit passage of the object being wrapped, this opening being shown substantially square but it may be otherwise shaped or proportioned dependent upon the size, shape and number of objects being wrapped. Additionally, the plate 35 is formed with a series of grooves 42 in its upper face said grooves being aligned with the guide wires 29 and adapted to receive the same in operation of the machine. These parts are so proportioned that the forward ends of the grooves 42 in the plate 35 when the carriage is at the end of its movement farthest from the bracket 12. Furthermore the grooves 42 are sufficiently deep to accommodate completely the wires 29 thus making possible presentation of the sheet material A directly on the upper surface of plate 35.

It will also be noticed in Figs. 12 and 13 that the upper surface of plate 35 is formed with a groove 44 adjacent to its rearward edge, said groove providing clearance for a cutter bar or knife which will later be described. The upper plate 34 is shown in detail in Figs. 14 and 15, and like the lower plate, it is characterized by a substantial central opening 45 which is adapted to overlie the opening 41. Preferably this upper plate is substantially octagonal in outline and has its opposite side portions 46 and 47 extending beyond the corresponding edges of the lower plate 35 when assembled. Around the opening 45 the plate 34 has imbedded in its lower surface a plurality of relatively thin blades 48, 49, 50, 51 and 52 which project edgewise a slight distance from the surface of the plate and are adapted for actual clamping contact against the sheet material on the lower plate 35. By reason of these thin edges on the insert blades, clamping pressure is concentrated most effectively on the film to hold the same taut across the openings 41 and 45 and between the plates 34 and 35. The blades 51 and 52 are respectively disposed forwardly and rearwardly of still another groove 53 which is formed in the upper plate 34 and in vertical alignment with the groove 44 of lower plate 35. Also it will be seen that the insert blades 50, 51 and 52 are formed with notches 54 which are in vertical alignment with grooves 42 of the lower plate for accommodation of the guide wires 29 and 30.

As previously stated the carriage and associated parts may be reciprocated on the frame bars or rods 10 and 11, the rearward movement being limited by the bracket 12, and the forward movement being limited by a pair of adjustable collars 60 and 61 which are respectively secured to the outer or forward ends of the rods 10 and 11. The distance between the bracket 12 and the bushings 60 and 61 is definitely set according to the size of the openings 41 and 45 and the amount of sheet material which it is desired to feed to the wrapping position during each cycle of operation. The reciprocation of the carriage together with the raising and lowering of upper plate 34 are effected by a single manual control in the illustrated embodiment. For this purpose a handle 62 extends transversely between the ends of a pair of levers 63 and 64, said levers being fulcrumed at 65 to the carriage side members 36 and 37. The inner or rearward ends of the levers 63 and 65 may be bifurcated for accommodation of elevating rollers 67 and 68 which are adapted to engage against the lower surfaces of the projecting portions 46 and 47 of upper clamping plate 34. As the handle 62 is pushed downwardly and rearwardly about the fulcrum point at 65, the rollers 67 and 68 will be moved to the uppermost point in their arcuate path and will correspondingly raise the upper clamping plate 34 sufficiently to disengage the clamping blades 48, 49, 50, 51 and 52 from the top surface of the plate 35 or from any film or sheet that might be lying on said plate at the time. This upward movement of plate 34 is resisted by coiled compression springs 70 surrounding the lowermost ends of dowels or guide pins 72 and 73 which are secured to the upper plate 34 and have close sliding fit in the lower plate 35 and the underlying portions of the carriage side members 36 and 37. The pressure exerted by the springs 70 augments the weight of the plate 34 to effect the clamping action and such pressure may be varied as desired through the medium of adjusting nuts 74.

After the upper clamping plate 34 has been elevated as has just been described, continued movement rearward of the handle 62 slides the carriage and its associated parts rearward until such movement is stopped by the bracket 12 and by such movement the film or sheet A which has previously been threaded through the guide means to rest between the guide wires 29 and 30 becomes positioned between the plates 34 and 35. The manual force exerted on the handle again swings upwardly causing the weight of plate 34 and the force of the springs 70 to press the edges of the clamping blades 48, 49, 50, 51 and 52 tightly against the so positioned film or sheet A. Thereafter a forward pull on the handle 62 returns the carriage and associated parts to the position shown in Figs. 1, 2, 3 and 4, drawing the sheet or film with it and unwinding a corresponding amount thereof from the stock roll B. The film or sheet, held taut by the clamping means, is now in the wrapping position.

As the carriage reaches the forward limit of its movement by abutment against the ends of the collars 60 and 61, the handle 62 may be additionally drawn upward against shoulders 76 on the forward ends of said collars 60 and 61. As this is done, a pair of extension arms 77 and 78 which are respectively carried by the levers 63 and 64 are swung downwardly against a cutter bar or knife blade 79 which normally rests within the groove 53 in the upper plate 34. The lower edge of the cutter bar or knife blade 79 is appropriately sharpened over a distance greater than the width of the sheet material A so that when it is driven downward by the extension arms 77 and 78 (see Fig. 8) it will sever the film or sheet on a corresponding line leaving a clamped blank of such material at the wrapping position and leaving the remainder of the material in position for presentation to the clamping means in the next cycle of operation. The cutter bar or knife blade 79 is normally urged upward by resilient wire springs 81 and 82 best shown in Fig. 1, said springs being anchored in or carried by the plate 34. To facilitate actuation of the knife blade, the outer ends of the extension arms 77 and 78 are formed with offset portions 83 which actually engage the knife blade. Preferably the knife blade 79 commences to cut the film or sheet at one edge and then cuts progressively across the sheet. This may be accomplished either by having an inclined cutting edge of the knife blade 79 or by inclining the blade as a whole, having one of the extension arms 77 or 78 strike the knife blade slightly in advance of the other. This latter operation is illustrated particularly in Fig. 5.

While the severed blank of sheet material is held in the clamping means D heat may be supplied from the heating means E. In the illustrated embodiment, the heating means E comprises a heat conducting box 90 which is carried between a pair of spaced arms 91 and 92 which are pivotally mounted on a transverse rod 93 disposed between extensions 95 and 96 of the carriage side members 36 and 37. At their outer ends the arms 91 and 92 are provided with hand grips 97 and 98 by means of either of which the heating means may be moved into the heating position shown in Fig. 9 or to its inactive position shown in Figs. 1, 2 and 7. The heat conducting box 90 may be formed of aluminum or other suitable material and preferably conforms to the shape of opening 45 in upper clamping plate 34 but slightly smaller than said opening to provide sufficient clearance for its insertion and its withdrawal. The operative face 99 of this heating box 90 is very slightly convex spherically and the arrangement is such that when in heating position as shown in Fig. 9 this convex surface comes completely in contact with the clamped film or sheet and actually pushes the engaged portion of the film or sheet very slightly but of its original plane. In so contacting the film or sheet there is no possibility of trapped air interfering with the uniform heating. Within the box 90 there is an appropriately insulated electric heating element of conventional type said heating element being energized through flexible conducting wires 100 connected with an appropriate source of current supply through a controlling rheostat 101. By adjustment of the rheostat the temperature to which the film or sheet is heated may be varied as desired for specific wrapping operations. When such film or sheet is of the type known as Pliofilm excellent results for average packages may be obtained by heating to approximately within a range of from 290° F. to 330° F. When the heating unit is in its inactive position as shown in Fig. 2, the arms 91 and 92 rest against a crossbar 102 which is connected to the carriage extension 95 and 96 by brackets 103 and 104.

After an article has been wrapped as above described and as partly illustrated in Figs. 16 and 18, the handle 62 may be depressed sufficiently to raise the upper clamping plate 34 against the action of springs 70 whereby to release the clamped edges of the sheet material. As the package is removed from the machine, the edge portions of the sheet which have been held in the clamping means will quickly shrink and move close to the adjacent end of the package appearing somewhat like a rosette. In case of some merchandise this extra material may be left on, and in other cases it may be partly or almost entirely removed with the aid of scissors or the like. In case the extra material is thus removed and if it is desired to more completely seal the package or to more completely shrink film or sheet on the package, the twisted and trimmed end may be momentarily held against or in close proximity with the heating surface 99 or against or in close proximity with some other appropriate heating surface.

From the method described, the packages will be quite snug with reference to the contained article. The degree of snugness or tightness and the extent to which the film or sheet conforms to the enclosed article may be varied to some extent by specific manipulation. Some of the factors which may be varied for this purpose are: (1) the area of the film or sheet in relation to the surface to be covered; (2) the degree of heat imparted to the film prior to stretching; (3) the distance of thrust beyond the initial clamped plane of the film or sheet; (4) the amount that the thrust-formed film or sheet is permitted to retract toward the original clamped plane just prior to or during the twisting operation; (5) the thickness of the initial film or sheet; (6) the time at which the clamped film edges are released with reference to completion of the package. Some of the variable factors enumerated above are dependent upon the properties of the specific material being used, while others are dependent upon the skill and dexterity of the operators.

For some purposes it is desirable to provide relatively loose but sealed wrappings in contradistinction to the previously described snug wrapping. This may be accomplished somewhat as shown in Figs. 16 to 18, inclusive. Thus in Fig. 16 a tubular and substantially cylindrical preforming device 110 may be thrust downwardly and beyond the plane of the clamped sheet or film of heated stretchable material to form a substantial central depression or recess indicated at 111. The article 112 which is to be wrapped (a doll with hair is shown by way of illustration) may then be dropped into the depression or recess 111 through preformer 110 while the latter is still in its preforming position. Thereafter the preformer 110 may be withdrawn, this being facilitated by holding a finger, stick or other appropriate stop member in a longitudinal slot 113 in one side of the member 110. In this way the article 112 is held down in the formed portion of the film or sheet and helped to maintain such formation while the member 110 is being withdrawn. Or the preformer 110 may be formed of resilient material in which case it may be partially collapsed when it can be freely withdrawn from the depression or recess 111 leaving the article 112 in said depression or recess. The material and parts will now be in the relative position shown in Fig. 17, whereupon the formed portion 111 with the article inside of it may be grasped and rotated to produce a contracting twist shown at 114 in Fig. 18.

In the method just described in reference to Figs. 16, 17 and 18, the preformer 110 may be left in contact with formed portions of the film or the sheet for a sufficient time to conduct heat therefrom, or in other words to cool the wrapping material so that it will not shrink excessively after the preformer is withdrawn. If desired, a blast of cooling air may be used to augment the preformer for this purpose.

Incidentally it is to be noted that the sack-like formation of the film or sheet as described in Figs. 16 to 18 inclusive, is not limited to loose wraps but may actually be used to receive and to contain candies, nuts, granular materials such as salt, sugar, coffee or plastic or fluid materials.

Obviously the invention is susceptible to modifications other than those illustrated and described, and the right is reserved to make such changes as fall within the scope of the appended claims without departing from the spirit of the invention.

This application is a continuation in part of application Serial No. 193,214, filed February 28, 1938.

I claim:

1. A method of wrapping with stretchable sheet material which comprises holding the sheet material by edge portions thereof, thrusting a hollow-preforming device against and beyond the plane of the held sheet, inserting the article to be wrapped through said preforming device, and then retracting said preforming device.

2. In the method of wrapping with stretchable sheet material the steps consisting of holding edge portions of a sheet of such material in substantially taut condition, heating the central portion of such sheet material, thrusting a hollow collapsible preforming device against and beyond the plane of the so held sheet whereby to form a depression or recess in said material, inserting the article to be wrapped through said preforming device, partially collapsing the preforming device and withdrawing it from the depression or recess leaving the article to be wrapped in said depression or recess.

3. A method of the character described, comprising heating predetermined portions of a web of elastic sheet material, forming pockets in the heated portions of the web with the aid of a hollow preforming device, placing in said pockets through said preforming device articles to be wrapped, and bringing together and closing the open ends of said pockets about the articles after the removal of the preforming device.

4. A method of the character described, comprising heating predetermined portions of a web of elastic sheet material, forming pockets in the web by stretching the heated portions thereof at an angle to the plane of the web with the aid of a hollow preforming device while holding the unheated portions in predetermined fixed positions, placing in said pockets through said preforming device articles to be wrapped, and bringing together and sealing the open ends of said pockets about the articles after the removal of the preforming device.

5. A method of the character described, comprising heating predetermined portions of a web of elastic sheet material, forming pockets in the heated portions of the web with the aid of a hollow preforming device, placing in said pockets through said preforming device articles to be wrapped, and closing said pockets about said articles by twisting the pockets and the articles simultaneously after the removal of the preforming device.

6. A method of the character described, comprising heating predetermined portions of a web of elastic sheet material, forming pockets in the web by stretching the heated portions thereof at an angle to the plane of the web with the aid of a hollow preforming device while holding the unheated portions in predetermined fixed positions, placing in said pockets through said preforming device articles to be wrapped, and closing said pockets about said articles by twisting the pockets and the articles simultaneously after the removal of the preforming device.

7. A method of the character described, comprising heating predetermined portions of a web of elastic sheet material, forming pockets in the heated portions of the web with the aid of a hollow preforming device, placing in said pockets through said preforming device articles to be wrapped, bringing together and closing the open ends of said pockets about the articles after the removal of the preforming device, and afterwards severing the pockets from said web.

8. A method of the character described, comprising heating predetermined portions of a web of elastic sheet material, forming pockets in the web by stretching the heated portions thereof at an angle to the plane of the web with the aid of a hollow preforming device while holding the unheated portions in predetermined fixed positions, placing in said pockets through said preforming device articles to be wrapped, bringing together and sealing the open ends of said pockets about the articles after the removal of the preforming device, and afterwards severing the pockets from said web.

9. The method, according to claim 8, including bringing together and sealing the stretched material forming the open ends in closing said pockets about the articles and the further step of positively holding said pockets in stretched condition by the preforming device while the articles to be wrapped are deposited in said pockets through said preforming device.

FRED B. PFEIFFER.

REFERENCES CITED

The following references are of record in the file of this patent:

UNITED STATES PATENTS

| Number | Name | Date |
|---|---|---|
| 892,702 | Wyman | July 7, 1908 |
| 1,856,694 | De Correvont | May 3, 1932 |
| 2,141,318 | Salfisberg | Dec. 27, 1938 |
| 2,146,308 | Maxfield | Feb. 7, 1939 |
| 2,155,445 | Pittenger et al. | Apr. 25, 1939 |
| 2,166,643 | Salfisberg | July 18, 1939 |
| 2,168,651 | McCoy | Aug. 8, 1939 |
| 2,210,509 | Strauch | Aug. 6, 1940 |
| 2,232,783 | Hausheer | Feb. 25, 1941 |
| 2,289,668 | Mallory | July 14, 1942 |
| 2,301,086 | Snyder | Nov. 3, 1942 |
| 2,301,106 | Brown | Nov. 3, 1942 |
| 2,302,846 | Farmer et al. | Nov. 24, 1942 |
| 2,312,049 | Pfeiffer | Feb. 23, 1943 |
| 2,327,170 | Calvert | Aug. 17, 1943 |
| 2,331,762 | Brown | Oct. 12, 1943 |
| 2,340,106 | Brown | Nov. 3, 1943 |
| 2,340,260 | Clunan | Jan. 25, 1944 |
| 2,403,482 | Cloud | July 9, 1946 |

OTHER REFERENCES

Cry-O-Vac, Bulletin, p. 1 Dewey and Almy Chemical Co.